Patented Jan. 5, 1937

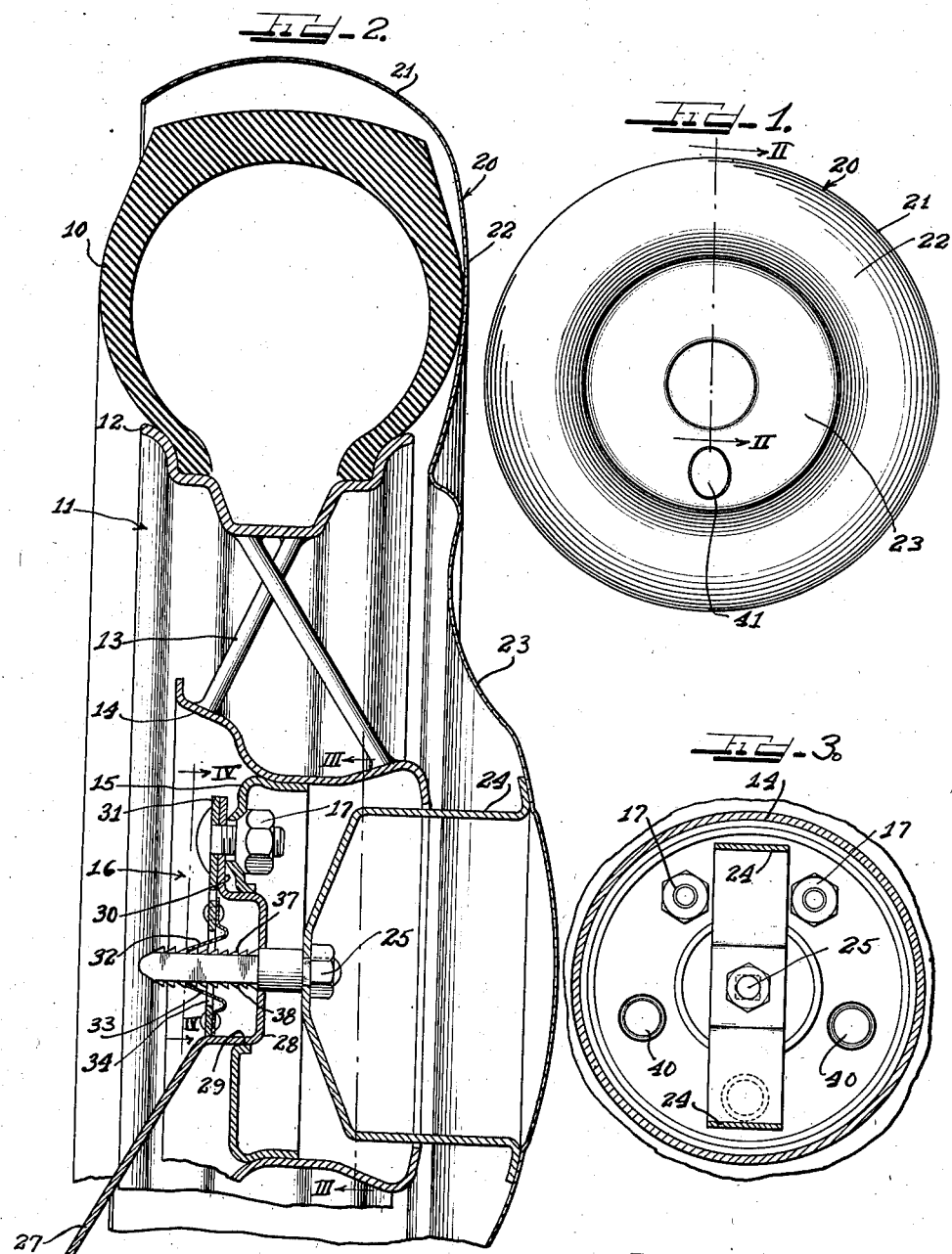

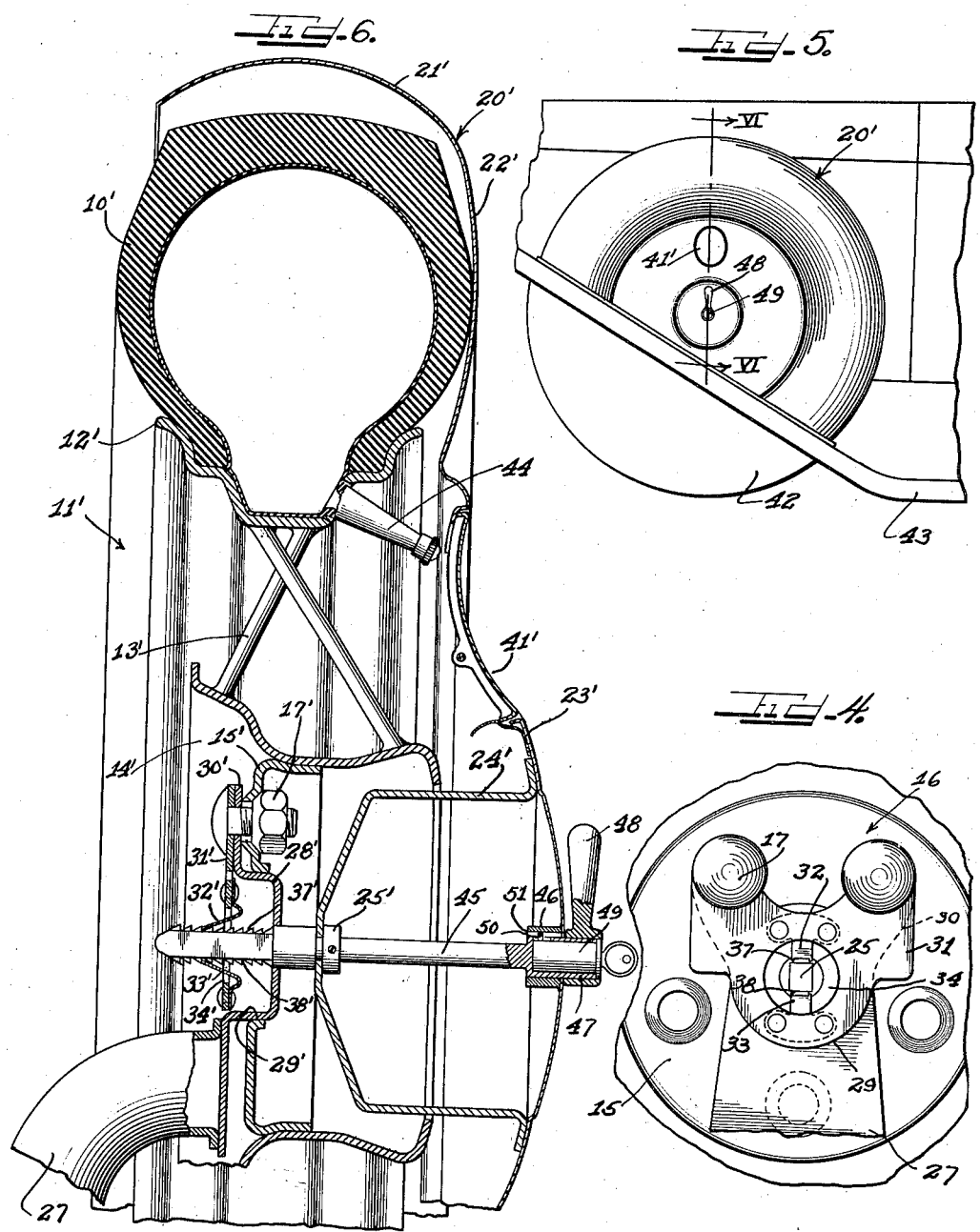

2,066,678

UNITED STATES PATENT OFFICE 2,066,678

COVER AND WHEEL ASSEMBLY

Arthur P. Fergueson, Detroit, Mich., assignor to Lyon Cover Company, Detroit, Mich., a corporation of Michigan Application November 24, 1934, Serial No. 754,589

24 Claims. (Cl. 150—54)

This invention relates to a spare tire cover and wheel assembly, and more particularly to a spare wheel and tire cover assembly in which the cover may be automatically retained in proper position over the wheel.

An object of this invention is to provide a spare tire cover and wheel assembly in which the tire cover may be secured in proper position over the wheel by the mere act of shoving the cover into position over the wheel.

Another object of this invention is to provide a spare tire cover with concealed retaining means for holding it in position over a spare tire, and which is automatically operable to retain the cover in this position by the mere act of shoving the cover into position over the tire.

A further object of the invention is to provide a spare wheel with means disposed centrally thereof for automatically cooperating with means on the under side of a cover for holding the cover on the spare wheel.

Still another object of the invention relates to the provision of a simplified spare tire cover and wheel assembly wherein the cover is secured in position over the wheel by an axial shoving of the cover on the wheel, and wherein the cover may be detached from the securing means by a rotation of the cover with reference to the wheel.

In accordance with the general features of this invention, there is provided a spare wheel assembly including a spare wheel and a cover including a disc-like side portion disposed over the central area of the wheel, this side portion having means adapted to be automatically engaged with cover retaining means in the central wheel area upon an axial movement of the cover with reference to the wheel; the cover being adapted to be disengaged from the retaining means only upon a rotation of the cover with respect to the wheel.

Another feature of the invention relates to the detailed structure of the cover retaining means and the manner in which it cooperates with means projecting from the rear of the disc-like cover portion so as to be automatically effective to hold the disc-like portion in a covering position upon the shoving of this portion into said position.

Another feature of the invention relates to the provision of a disc-like cover plate for a wheel, having a rearwardly projecting central plunger adapted to be projected into disc-retaining means as the disc-like plate is mounted on the wheel.

Other objects and features of this invention will more fully appear from the following detailed description, taken in connection with the accompanying drawings, which illustrate several embodiments thereof, and in which:

Figure 1 is a side elevation of a spare wheel assembly such as is carried on the rear of an automobile and which embodies the features of this invention;

Figure 2 is an enlarged fragmentary sectional view taken on the line II—II of Figure 1, illustrating in detail the features of this invention;

Figure 3 is a sectional view taken on the line III—III of Figure 2, looking in the direction indicated by the arrows;

Figure 4 is a fragmentary rear view of the central part of the wheel shown in Figure 2;

Figure 5 is a side elevation of a spare wheel assembly applied to a fender well on an automobile and embodying the features of this invention;

Figure 6 is an enlarged fragmentary sectional view taken substantially on the line VI—VI of Figure 5, looking in the direction indicated by the arrows, and illustrating a modified construction in which a key operated locking means is employed to lock the disc-like cover against removal from the spare wheel.

On the drawings:

The reference character 10 designates generally a spare tire mounted on a wheel 11 having a drop center tire rim 12 connected by spokes 13 to a hollow central wheel hub 14. The wheel hub 14 has secured inwardly of it a flange 15 adapted to be secured by means of bolts and nuts 17 to a supporting structure designated generally by the reference numeral 16, and which will be described more in detail hereinafter.

Disposed over the wheel and tire, as best shown in Figures 1 and 2, is a spare tire cover designated generally by the reference numeral 20, and which includes a tread covering portion 21, an annular side portion 22 for disposition over the outer side wall of the spare tire 10, and a central portion 23 for disposition over the wheel 11. The central portion 23 extends clear across the center of the wheel, including the wheel hub 14, and has secured to its rear side a U-shaped strap or bracket 24, to an intermediate portion of which is secured a cover retaining bolt or plunger 25 embodying the features of this invention. The legs of the strap 24 are adapted to extend through the opening and into the interior of the wheel hub 14, as best shown in Figure 2.

The plunger or bolt 25 which is secured to the strap 24 projects rearwardly therefrom and is disposed concentric with the axis of the wheel 11. It, by the act of shoving the cover axially on the spare wheel, is adapted to be forced into cover retaining means comprising part of the supporting structure 16. This supporting structure 16 includes a bracket or arm 27 which extends upwardly from, and may be secured in any suitable way to, the side or rear of an automobile. The upper end of the arm 27 is provided with a laterally projecting cup-shaped portion 28 adapted to fit in an opening 29 in the hub flange 15. This cupshaped portion 28 has integral with it an upwardly extending V-shaped portion 30, as best shown in Figure 4, adapted to be secured to the hub flange 15 by means of the two bolts and nuts 17. Also connected to the same bolts is a plate 31 which projects downwardly from the rear side of the cup-shaped portion 28 and has secured to its inner side spring elements 32 and 33 which project rearwardly through an opening 34 in the plate 31 and are adapted to receive the free end of the bolt 25. Also the bolts, which are preferably studs, may be permanently secured to the carrier, as, when the wheel is removed, they can thus remain in place.

The free ends of the two spring elements 32 and 33 are adapted to engage toothed surfaces 37 and 38 respectively, on opposite sides of the rearwardly projecting end of the bolt 25. It will be noted (Fig. 4) that the free end of the bolt 25 is of substantially a square cross section and has two of its sides provided with the toothed surfaces 37 and 38, and its two other sides formed flat, so that upon a relative rotation of the bolt 25 and the spring elements 32 and 33, the free ends of the spring elements can be disengaged from the toothed surfaces and brought to bear on the flat or smooth sides of the bolt-like element or plunger. The cover may thereafter be removed axially from the spare wheel.

In the mounting of the spare wheel, all that is necessary is to shove it axially on the tire, whereby the plunger 25 is inserted between the ends of the spring elements 32 and 33. After the cover has come to bear on the side wall of the tire or upon the side wall of the wheel, as the case may be, the free ends of the spring like elements 32 and 33 engage the shoulders of opposite teeth of the toothed surfaces 37 and 38 and hold the cover in position firmly on the wheel and tire.

At this time, I wish to call attention to the fact that while I have illustrated a one piece cover which covers both the side wall and tread of the tire, the invention is not limited to such a one piece tire cover, but may be used with equal advantage with other tire cover constructions, or with disc-like covers for covering only the wheel. In the latter event, the disc or central portion 23 would terminate adjacent the outer periphery of the tire rim 12 of the wheel 11.

Also, it should be noted that the bolts and nuts 17 used to secure the wheel to the supporting arm 27 extend through the usual bolt holes 40 in the wheel hub flange 15. While I have illustrated only two of these bolts, it is to be appreciated that it is within the scope of this invention to use any number of bolts, depending upon the design of construction desired. These bolts serve not only to secure the wheel to the supporting arm 27, but also secure the plate carrying the spring elements 32 and 33 in a position to accommodate the toothed end of the plunger-like bolt 25.

Furthermore, the central portion 23 of the cover may be provided with a hinged flap 41 which may be pivoted to expose the valve stem of the tire. While this flap may be of any suitable construction, I prefer to make it of a construction such as that shown in the modification of the invention illustrated in Figure 6, wherein the flap is designated by the reference numeral 41'. The structure of this flap, however, does not constitute a part of my present invention.

In Figures 5 and 6, I have illustrated a modification of my invention in which the invention is illustrated as being applied to a fender well installation of a spare wheel assembly. The spare tire 10' and the wheel 11' are mounted in a fender well 42 formed in an automobile fender 43.

Disposed on the spare tire and wheel is a tire cover designated generally by the reference numeral 20', which extends around more than 180° of the outer periphery of the tire, and has its lower end formed open, so that its two opposite ends terminate at the top of the well 42. This tire cover 20' includes a tread covering portion 21' and an arcuate side portion 22' connected to a central wheel covering portion 23'. The central wheel portion 23' has the hinged flap 41' behind which is located the usual valve stem 44, connected to the spare tire 10'. The spare tire 10' is mounted on a rim 12' of the wheel 11', which rim is connected by spokes 13' to a hollow hub 14' having an interior central flange 15' with bolt holes for accommodating bolts and nuts 17'.

The central portion 23' of the cover has secured to its rear side a U-shaped strap 24' which is adapted to telescope the opening in the outer side of the wheel hub when the cover is shoved into position on the spare wheel. Secured to this strap 24' is a plunger-like bolt 25' adapted to be inserted between springs 32' and 33' secured to a plate 31'. The plate 31' is held by the bolts 17' projecting through an extended portion 30' on the upper end of a cup portion 28' secured to a supporting arm 27'. This supporting arm 27' is secured in any suitable way to the vehicle and serves the purpose of holding the spare wheel in position in the fender well 42.

The cup portion 28' telescopes an opening 29' formed in the center of the flange 15' and is thus aligned with the plunger-like bolt 25'. That is to say, this cup portion 28' has a central opening through which the bolt is adapted to project when it is moved into cooperation with the free ends of the two yieldable spring elements 32' and 33' which project rearwardly through an opening 34' in the plate 31'.

The central bolt 25' has diametrically opposite two surfaces 37' and 38' adapted to cooperate with the spring elements in the same manner as the previously described structure illustrated in Figure 2. The spring elements may be concealed at the rear of the wheel by a bracket extension, if such concealment is desired.

The plunger-like bolt 25' has an outwardly projecting extension 45 which extends through sleeve 46 and through a central opening in the cover portion 23'. The sleeve portion 46 is secured to the central portion 23' of the cover and has a groove 51 for cooperation with a locking lug 50 associated with a conventional key operated locking cylinder 49 disposed in an enlarged end 47 of the extension 45. Also secured to the enlarged end 47 of the extension 45 is a handle 48 by means of which the rod 25' may be turned when it is desired to disengage the two surfaces 37' and 38' from the spring elements 32' and 33' so as to bring the free ends of these spring elements into engagement with the opposite smooth sides of the rear end of the bolt 25'. When the bolt 25' has been rotated to this position, the cover may thereafter be removed axially from the tire.

The cover is mounted on and secured to the spare wheel in the same manner as the previously illustrated form of cover, with the exception that instead of turning the cover, the locking bolt 25' is turned by means of the handle 48. Thereafter, the bolt may be locked in any position in which it is in retained engagement with the spring elements 32' and 33' by operating the key operated lock means to project the lug 50 into the groove 51 in the sleeve 46.

It is to be understood that while I have illustrated and described and speak of the preferred forms of this invention, the invention is not to be thus limited, but only insofar as defined by the scope of the appended claims.

I claim as my invention:

1. In a spare wheel assembly, a spare wheel, a cover including a side portion disposed over the central area at the inner periphery of the wheel, resilient cover retaining means in said central area, and means associated with said cover side portion and projectable within said periphery and automatically engageable with said retaining means as the cover is placed in position over the wheel for holding the cover in said position, said retaining means being shielded by said side portion when the cover is in said position.

2. In a spare wheel assembly, a spare wheel, a cover including a side portion disposed over the central area of the wheel, cover retaining means in said central area, and means associated with said cover side portion automatically engageable with said retaining means as the cover is placed in position over the wheel for holding the cover in said position, said cover being removable from the wheel only upon a relative rotation of said two means.

3. In a spare wheel assembly, a spare wheel, a cover including a side portion disposed over the central area of the wheel, cover retaining means in said central area, and means associated with said cover side portion automatically engageable with said retaining means as the cover is placed in position over the wheel for holding the cover in said position, said means being inaccessible from the outer side of the cover, and being adapted to be disengaged only upon the rotation of one of the means with respect to the other.

4. In a spare wheel assembly, a spare wheel, a cover including a side portion disposed over the central area at the inner periphery of the wheel, yieldable cover retaining means in said central area, and means associated with said cover side portion and projectable within said periphery and automatically engageable with said retaining means as the cover is placed in position over the wheel for holding the cover in said position, said means being covered by said side portion of the cover so as to be inaccessible when the cover is secured in position on the wheel.

5. In a spare wheel assembly, a spare wheel, a cover including a side portion disposed over the central area of the wheel, cover retaining means in said central area, and means associated with said cover side portion engageable with said retaining means as the cover is placed in position over the wheel for holding the cover in said position, said cover retaining means including a yieldable element, and the other means including a member insertable between said element and another part of said retaining means to be held against retraction from therebetween and requiring that it be rotated to disengage it from said elements.

6. In a spare wheel assembly, a spare wheel, a cover including a side portion disposed over and shaped to shield substantially an entire side of the wheel and the central area at the inner periphery of the wheel, cover retaining means in said central area, means associated with said cover side portion and projectable within said periphery and automatically engageable with said retaining means as the cover is placed in position over the wheel for holding the cover in said position, and means for locking said cover in said position with the aforesaid means engaged and protected against unauthorized access.

7. In a spare wheel assembly, a spare wheel, a cover including a side portion disposed over the central area of the wheel, cover retaining means in said central area, and means associated with said cover side portion engageable with said retaining means as the cover is placed in position over the wheel for holding the cover in said position, said means being engageable with each other upon an axial movement of the cover on the wheel, and being adapted to be disengaged upon rotation of the cover with respect to the wheel.

8. In a spare wheel assembly, a spare wheel, a cover including a side portion disposed over the central area of the wheel, cover retaining means in said central area, and means associated with said cover side portion engageable with said retaining means as the cover is placed in position over the wheel for holding the cover in said position, said cover retaining means including yieldable elements, and the other means including a member insertable between said elements to be held against retraction from therebetween and requiring that it be rotated to disengage it from said elements, said elements each including a rearwardly slanting spring, and said member having teeth over which the ends of the elements are slidable as the member is shoved between the elements, and which teeth have shoulders engageable with the ends of the spring elements to prevent an outward movement of the member.

9. In a spare wheel assembly, a spare wheel, a cover including a side portion disposed over the central area of the wheel, cover retaining means in said central area, and means associated with said cover side portion engageable with said retaining means as the cover is placed in position over the wheel for holding the cover in said position, said cover retaining means including yieldable elements, and the other means including a member insertable between said elements to be held against retraction from therebetween and requiring that it be rotated to disengage it from said elements, said member being secured in a central position to the rear side of said cover portion so as to be movable with the cover as it is shoved axially onto the wheel.

10. In a spare wheel assembly, a spare wheel, a cover including a side portion disposed over the central area of the wheel, cover retaining means in said central area, and means associated with said cover side portion engageable with said retaining means as the cover is placed in position over the wheel for holding the cover in said position, said cover retaining means including yieldable elements, and the other means including a member insertable between said elements to be held against retraction from therebetween and requiring that it be rotated to disengage it from said elements, said elements each including a rearwardly slanting spring, and said member having teeth over which the ends of the elements are slidable as the member is shoved between the elements, and which teeth have shoulders engageable with the ends of the spring elements to prevent an outward movement of the member, said member having opposite longitudinal sides provided with said teeth, and having intermediate and opposite and flat sides adapted to be brought into register with the ends of the spring elements by a rotation of the member, whereby the spring elements can slide on said flat sides as the member is retracted from between said elements.

11. In a spare wheel assembly, a spare wheel, a cover including a side portion disposed over the central area of the wheel, cover retaining means in said central area, and means associated with said cover side portion engageable with said retaining means as the cover is placed in position over the wheel for holding the cover in said position, said cover retaining means including yieldable elements, and the other means including a member insertable between said elements to be held against retraction from therebetween and requiring that it be rotated to disengage it from said elements, said elements each including a rearwardly slanting spring, and said member having teeth over which the ends of the elements are slidable as the member is shoved between the elements, which teeth have shoulders engageable with the ends of the spring elements to prevent an outward movement of the member, and key operated means for locking said member with its teeth engaged by said spring elements.

12. In a spare wheel assembly, a spare wheel, a cover including a side portion disposed over the central area of the wheel, cover retaining means in said central area, and means associated with said cover side portion engageable with said retaining means as the cover is placed in position over the wheel for holding the cover in said position, said cover retaining means including a yieldable element, and the other means including a member insertable between said element and another part of said retaining means to be held against retraction from therebetween and requiring that it be rotated to disengage it from said element, said cover retaining means and a central part of the wheel being connected together, and said other means being secured to and carried by the cover.

13. In a spare wheel assembly, a spare wheel, a cover including a side portion disposed over the central area of the wheel, cover retaining means in said central area, and means associated with said cover side portion engageable with said retaining means as the cover is placed in position over the wheel for holding the cover in said position, said cover retaining means including a yieldable element, and the other means including a member insertable between said element and another part of said retaining means to be held against retraction from therebetween and requiring that it be rotated to disengage it from said elements, said wheel having a central flange, said retaining means and said flange being connected together adjacent the axis of the wheel, and said other means being secured to the back of said side portion at the axis of the wheel so as to be plunged axially into said retaining means when the cover is shoved axially onto the wheel.

14. As an article of manufacture, a wheel cover adapted to be shoved axially onto a wheel and including a side portion for disposition over substantially an entire side of the wheel and having rearwardly projecting centrally disposed means automatically engageable with cover retaining means at the axis of the wheel for holding the cover in retained position.

15. As an article of manufacture, a wheel cover adapted to be shoved axially onto a wheel and including a side portion for disposition over the wheel and having rearwardly projecting centrally disposed means automatically engageable with cover retaining means at the axis of the wheel for holding the cover in retained position, the first means including a plunger-like element having a surface provided with a projection over which the cover retaining means is slidable during the shoving of the cover over the wheel, but including abutment means engageable with said retaining means to prevent removal of the cover unless said element is rotated.

16. As an article of manufacture, a wheel cover adapted to be shoved axially onto a wheel and including a side portion for disposition over the wheel and having rearwardly projecting centrally disposed means automatically engageable with cover retaining means at the axis of the wheel for holding the cover in retained position, the first means being moved into its engaged position by an axial movement of the same, and being movable into its disengaged position by a rotary movement of the same.

17. In a spare wheel assembly, a spare wheel, a cover including a side portion disposed over the central area of the wheel, cover retaining means in said central area, and means associated with said cover side portion and engageable with said retaining means as the cover is placed in position over the wheel for holding the cover in said position, said means being inaccessible from the outer side of the cover, and being adapted to be disengaged only upon the rotation of one of the means with respect to the other.

18. In a spare wheel assembly, a spare wheel, a cover including a side portion disposed over the central area of the wheel, cover retaining means in said central area, and means associated with said cover side portion and engageable with said retaining means as the cover is placed in position over the wheel for holding the cover in said position, said cover retaining means including a yieldable element, and the other means including a member insertable between said element and another part of said retaining means to be held against retraction from therebetween and requiring that it be rotated to disengage it therefrom, said element including a rearwardly slanting spring, and said member having one or more teeth over which the element is slidable as the member is shoved against the element, said one or more teeth having shoulders engageable with the spring element to prevent outward movement of the member.

19. In a spare wheel assembly, a spare wheel, a cover including a side portion disposed over the central area of the wheel, cover retaining means in said central area, and means associated with said cover side portion and engageable with said retaining means as the cover is placed in position over the wheel for holding the cover in said position, said cover retaining means including a yieldable element, and the other means including a member insertable between said element and another part of said retaining means to be held against retraction from therebetween and requiring that it be rotated to disengage it therefrom, said member being secured in a central position to the rear side of said cover portion so as to be movable with the cover as it is shoved axially toward the wheel.

20. In a spare wheel assembly, a spare wheel, a cover including a side portion disposed over the central area of the wheel, cover retaining means in said central area, and means associated with said cover side portion and engageable with said retaining means as the cover is placed in position over the wheel for holding the cover in said position, said cover retaining means including a yieldable element, and the other means including a member insertable between said element and another part of said retaining means to be held against retraction from therebetween and requiring that it be rotated to disengage it therefrom, said element including a rearwardly slanting spring, and said member having one or more teeth over which the element is slidable as the member is shoved against the element, said one or more teeth having shoulders engageable with the spring element to prevent outward movement of the member, said member having a longitudinal side provided with said one or more teeth, and having a flat side adapted to be brought into register with the spring element by a rotation of the member, whereby the spring element can slide on said flat side as the member is retracted.

21. In a spare wheel assembly, a spare wheel, a cover including a side portion disposed over the central area of the wheel, cover retaining means in said central area, and means associated with said cover side portion and engageable with said retaining means as the cover is placed in position over the wheel for holding the cover in said position, said cover retaining means including a yieldable element, and the other means including a member insertable between said element and another part of said retaining means to be held against retraction from therebetween and requiring that it be rotated to disengage it therefrom, said element including a rearwardly slanting spring, and said member having one or more teeth over which the element is slidable as the member is shoved against the element, said one or more teeth having shoulders engageable with the spring element to prevent outward movement of the member, and key operated means for locking said member with a tooth engaged by said spring element.

22. In a wheel assembly, a mounted wheel including a central mounting flange, and yieldable means centrally disposed relative to said flange for automatically engaging a part projecting centrally through said flange from the rear of a cover for the wheel to retain said cover in centered relation to the wheel.

23. In a wheel assembly, a mounted wheel including a central mounting flange, and means centrally disposed relative to said flange for automatically engaging a part projecting centrally through said flange from the rear of a cover for the wheel to retain said cover in centered relation to the wheel, said means including spaced inclined spring elements having free ends for engaging the cover part.

24. In an assembly including a mounted spare wheel and tire, cover retaining means in the central area of the wheel, a cover including a side portion for disposition over said central area to prevent access to said retaining means and the wheel-mounting means, and adjustable means associated with said side portion and automatically engageable with said retaining means as the cover is placed into position over the wheel, said cover being also engageable with the tire and held in firm engagement with the tire by said retaining means, said retaining means permitting lateral adjustment of the cover relative to the tire to take up any play incident to variations of size of or wear of the tire.

ARTHUR P. FERGUESON.